(12) United States Patent
Altman et al.

(10) Patent No.: US 7,461,209 B2
(45) Date of Patent: Dec. 2, 2008

(54) TRANSIENT CACHE STORAGE WITH DISCARD FUNCTION FOR DISPOSABLE DATA

(75) Inventors: Erik R. Altman, Danbury, CT (US); Michael Karl Gschwind, Chappaqua, NY (US); Robert Kevin Montoye, Austin, TX (US); Jude A. Rivers, Cortlandt Manor, NY (US); Sumedh Wasudeo Sathaye, Cary, NC (US); John-David Wellman, Hopewell Junction, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 11/295,300

(22) Filed: Dec. 6, 2005

(65) Prior Publication Data

US 2007/0130237 A1    Jun. 7, 2007

(51) Int. Cl.
  *G06F 12/12* (2006.01)
(52) U.S. Cl. .................. 711/133; 711/141; 711/144; 711/154; 711/159
(58) Field of Classification Search .......... 711/133, 711/141, 144, 154, 159
See application file for complete search history.

(56) References Cited

U.S. PATENT DOCUMENTS

| | | | |
|---|---|---|---|
| 4,414,644 A * | 11/1983 | Tayler | 711/162 |
| 4,679,141 A | 7/1987 | Pomerene et al. | |
| 5,297,269 A | 3/1994 | Donaldson et al. | |
| 5,592,634 A | 1/1997 | Circello et al. | |
| 5,675,768 A | 10/1997 | Tran et al. | |
| 6,108,764 A | 8/2000 | Baumgartner et al. | |
| 6,728,854 B2 * | 4/2004 | Frank | 711/170 |
| 7,313,653 B2 * | 12/2007 | Fanning | 711/133 |
| 2002/0095553 A1 * | 7/2002 | Mendelson et al. | 711/118 |
| 2003/0154351 A1 | 8/2003 | Nilsson et al. | |
| 2004/0111562 A1 | 6/2004 | Arimilli et al. | |
| 2006/0095682 A1 * | 5/2006 | Fuente et al. | 711/141 |

OTHER PUBLICATIONS

Doner, DF Emma et al., Improving Operational Performance of Cache Memories-Execution Tracing, IBM Technical Disclosure Bulletin; Feb. 1989; p. 83-84, IBM, United States.

Eickenmeyer, RJ; Using History to Improve the Handling of Address Generation Interlocks in Branch Instructions; IBM Technical Disclosure Bulletin; Jan. 1992; p. 330-335, IBM, United States.

* cited by examiner

*Primary Examiner*—Jack A Lane
(74) *Attorney, Agent, or Firm*—Michael R. Nichols; Casimer K. Salys (57) ABSTRACT

A method and apparatus for storing non-critical processor information without imposing significant costs on a processor design is disclosed. Transient data are stored in the processor-local cache hierarchy. An additional control bit forms part of cache addresses, where addresses having the control bit set are designated as "transient storage addresses." Transient storage addresses are not written back to external main memory and, when evicted from the last level of cache, are discarded. Preferably, transient storage addresses are "privileged" in that they are either not accessible to software or only accessible to supervisory or administrator-level software having appropriate permissions. A number of management functions/instructions are provided to allow administrator/supervisor software to manage and/or modify the behavior of transient cache storage. This transient storage scheme allows the cache hierarchy to store data items that may be used by the processor core but that may be too expensive to allocate to external memory.

15 Claims, 9 Drawing Sheets

TRANSIENT CACHE STORAGE WITH DISCARD FUNCTION FOR DISPOSABLE DATA

BACKGROUND OF THE INVENTION

1. Technical Field

The present invention relates generally to the area of cache architectures for computer systems. Specifically, the present invention relates to a cache system that allows for the existence of cache lines for storing trace data and other empirical information, in which these particular cache lines are not written back to main memory.

2. Description of the Related Art

Current processors generate and collect a multitude of data intended to improve performance of a computer system. This includes performance monitoring data (e.g., profile data), branch prediction data, performance monitor data, pre-decoded instruction information, branch history information, branch prediction tables, and the like. Some of this data is stored in dedicated arrays or tables (e.g., profile data tables, branch history tables, or branch target address caches), while other data is stored in conjunction with instructions in the L1 (Level 1) instruction cache (such as pre-decode information, or in some instances, a secondary level of branch prediction information).

Additional data that can be collected and exploited continues to be discovered, so this trend of collecting and storing data for use in decision making is an increasing phenomenon. As the amount of data to be stored exceeds the size of the available dedicated arrays, these data are today usually discarded and later regenerated. In some cases, useful information may become lost, as branch prediction information must be reacquired in toto. In other instances, the data can be regenerated, but at the cost of spending additional time or power in recomputing the information. A cost/benefit tradeoff may result, as the value of the information collected is exceeded by the area cost or design/verification costs associated with enabling the information to be collected.

In some instances, a dedicated auxiliary storage hierarchy can be introduced to store this information, but at the cost of additional silicon area and design/test complexity. Some examples of existing technology using such a dedicated auxiliary storage hierarchy may be found in U.S. Pat. No. 4,679,141 (POMERENE et al.) 1987-07-07 and in processor cores developed by manufacturers Advanced Micro Devices, Inc. (the "Hammer" core) and Intel Corporation (Itanium 2).

One of the primary reasons why existing processor designs have utilized a dedicated auxiliary storage hierarchy is that it is generally advantageous to correlate processor metadata to the address of the data or instructions that relate to such metadata. For example, metadata relating to an instruction that causes a condition to occur in a processor should preferably be associated in some form with the address of the underlying instruction. The most straightforward way to do this is to give the metadata the same numerical address as that of the underlying instruction. The problem with this is, however, that it precludes storing the metadata and the underlying data or instruction in the same cache structure, since the two pieces of data would have conflicting storage addresses in the cache. Since the metadata is of minimal value without the underlying data or instructions it references, it becomes necessary, then, to either create a separate cache hierarchy to store the metadata or to use "hidden bits" or other forms of ancillary storage to store the metadata.

Therefore, what is needed is a means of providing better storage capabilities for data that is useful, but not necessarily critical, without adding significant system cost. A method of allowing data and processor metadata to coexist in a unified cache hierarchy without the use of such auxiliary data storage constructs as "hidden bits" is also needed. It would also be advantageous to be able to dynamically adapt such metadata storage to immediate performance and resource requirements during processor operation. The present invention provides a solution to these and other problems, and offers other advantages over previous solutions.

SUMMARY OF THE INVENTION

The present invention provides a method and apparatus for storing non-critical processor information, including such empirical and experiential information as instruction trace and branch prediction information, without imposing significant costs on a processor design. According to a preferred embodiment of the present invention, transient data are stored in the processor-local cache hierarchy (in another embodiment, a cache hierarchy shared among multiple processors is used). This is achieved by providing an additional control bit in addresses requested or supplied when operating within the processor-local cache hierarchy. In one embodiment, this additional control bit forms part of the tag used to determine whether a particular cache access has been a hit or miss in a specific cache line. In another embodiment, this bit is used to determine the equivalence class to use when performing a cache lookup.

Addresses having the control bit set (i.e., to "1") are referred to herein as "transient storage addresses." Transient storage addresses are not written back to external main memory and, when evicted from the last level of cache, are discarded. Preferably, transient storage addresses are "privileged" in that they are either not accessible to software or only accessible to supervisory or administrator-level software having appropriate permissions.

In a preferred embodiment, a number of management functions/instructions are provided to allow administrator/supervisor software to manage and/or modify the behavior of transient cache storage. These functions may include defining the size of the transient storage address space, invalidating one or more transient storage entries/cache lines, partitioning/allocating transient storage address space among a plurality of application programs, and directly reading or writing to/from transient storage space.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
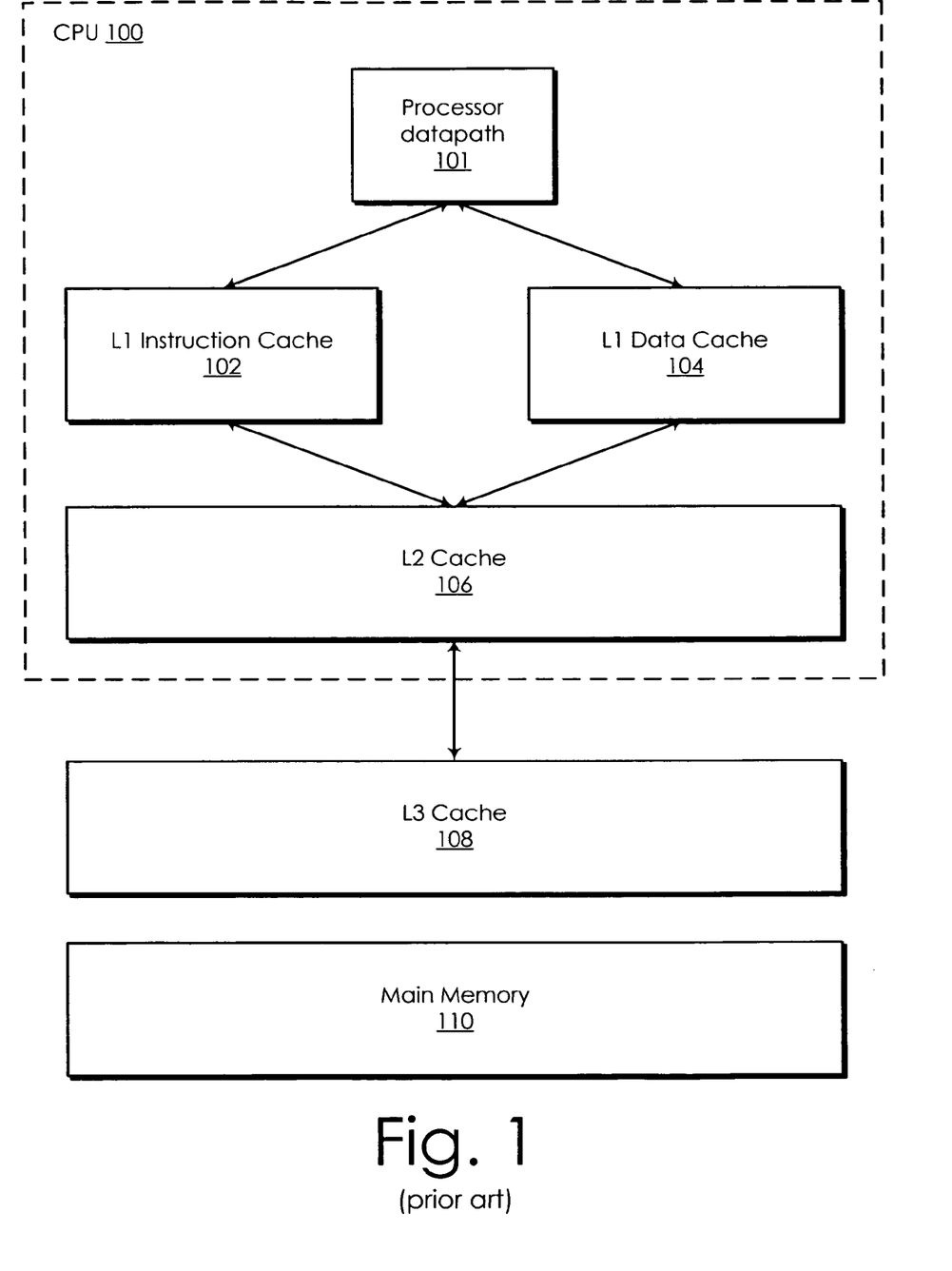
FIG. 1 is a diagram illustrating a hierarchical cache architecture as known in the art.

FIG. 1 is a diagram illustrating a multi-level cache architecture as may be utilized in a preferred embodiment of the present invention. Central processing unit (CPU) 100 comprises a main processor datapath 101, a Level 1 (L1) instruction cache 102, and a Level 1 (L1) data cache 104. L1 caches 102 and 104 improve the memory access performance of CPU 100 by providing quickly accessed, processor-local copies of currently in-use memory locations from which instructions are read (instruction cache 102) and data are read and written (data cache 104). Utilizing separate L1 instruction and data caches, as shown in FIG. 1, allows some of the performance benefits of a Harvard-style computer architecture (namely the ability to simultaneously read instructions and data from different memory systems) while preserving the computational flexibility of a Von Neumann-style architecture (where instructions and data reside in a common address space). CPU 100 also contains a Level 2 (L2) cache 106 (larger and somewhat slower than L1 caches 102 and 104), which provides quickly-accessed copies of information for rapid copying into L1 caches 102 and 104. A CPU-external (L3) cache 108 is interposed between L2 cache 106 and main memory 110 and serves a similar intermediary caching function to L2 cache 106.

Each level of this multi-level cache arrangement provides a limited number of rapid-access temporary storage locations, typically broken into "cache lines" consisting of a contiguous block of memory addresses. When all available cache lines are occupied in a particular cache level and it is necessary to access a memory address from a cache line that is not presently stored in that cache level, at least one cache line must be evicted from that cache level to make room for the new cache line. When this happens, the evicted cache line is typically "written back" to the next lowest cache level (e.g., to level 3 from level 2), or to main memory, if the cache line is being evicted from the lowest cache level. This scheme is referred to as a "write back" cache. In another kind of cache, a "write through" cache, each write to a cache line is propagated through to all cache levels immediately, so there is no need to perform a write back operation when the cache line is eventually evicted from the cache.

As shown in FIGS. 2-5 in several variations, a preferred embodiment of the present invention uses a hierarchical cache to provide transient storage space for recording various kinds of non-critical processor data. A certain number of cache lines in the cache are allowed to be used for transient storage. Transient storage cache lines are not written back or written through to main memory, but are simply deleted when being evicted from the lowest-level cache (alternatively, transient storage cache lines can be deleted when being evicted from a higher-level cache rather than allowing them to reach the lowest cache level). An additional address bit is used to denote whether a given cache line in the cache is being used for transient storage or not, as shown in FIG. 6 (q.v.).

One particularly useful application of transient cache storage as described herein is in the area of trace-based scheduling of instructions in a processor. With trace-based scheduling, certain groups of basic blocks within a program (such as a group of basic blocks making up a loop, for example) are identified by the processor, and trace information corresponding to the execution of those blocks is stored for subsequent use. These groups are referred to as "trace groups." When code corresponding to a trace group has been executed before, the processor can use the stored trace information to perform branch prediction and improve the overall performance of the code.

Figure 2:
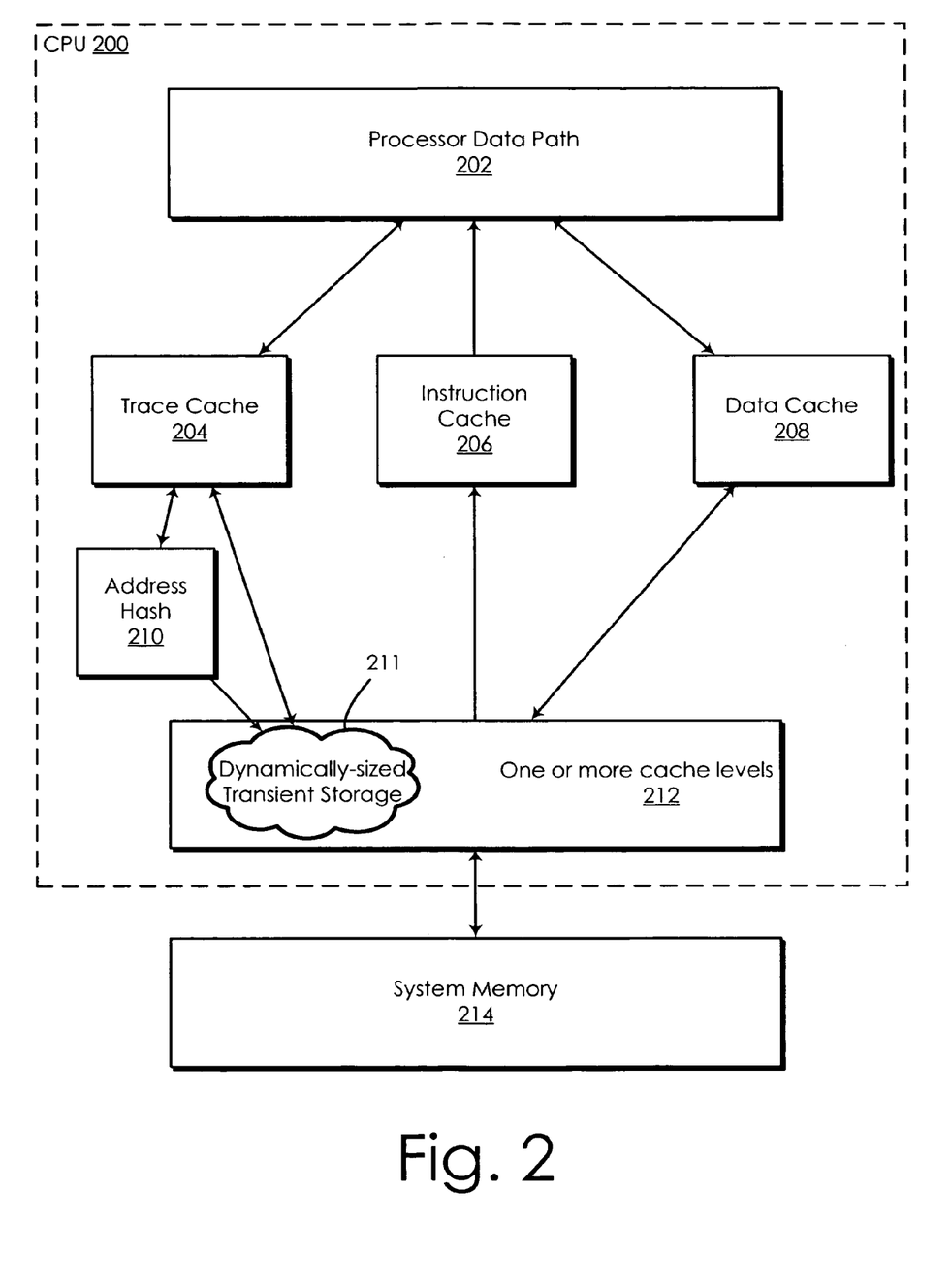
FIG. 2 is a diagram illustrating a hierarchical cache architecture employing dynamically-sized transient storage for storing trace information in accordance with a preferred embodiment of the present invention.

FIG. 2 is a diagram of a hierarchical cache system in which a trace cache is utilized in conjunction with transient storage to enable the efficient storage and retrieval of instruction trace information. CPU 200 comprises a processor data path 202 as well as three first-level caches, a trace cache 204, instruction cache 206, and data cache 208. Trace cache 204 is used to store instruction trace information for use in subsequent trace-based scheduling. A certain number of cache lines in second- and subsequent-level caches 212 are allocated for use as transient storage 211. Transient storage 211 is dynamically sized-that is, the size of transient storage 211 may be enlarged or reduced while CPU 200 is executing code.

In a preferred embodiment of the invention, special instructions are provided to allow a program (such as an operating system, for example) to dynamically set the size of transient storage 211 as needed. For instance, certain programs (such as a database engine, for example) may be relatively simple from a computational standpoint, but need to access a large amount of memory; such programs would benefit from having a smaller transient storage space relative to the rest of the cache. On the other hand, signal-processing software or software for performing numerical mathematics may not require as much memory space, but may employ nested loops or other complex control structures that would benefit from having a larger transient storage space. Therefore, the ability to dynamically resize the transient space is a highly beneficial feature of a preferred embodiment of the present invention.

Because it is generally advantageous to correlate trace information to the memory address of the program code to which the trace information relates, the entries in trace cache 204 will generally have addresses that match addresses of instructions in instruction cache 206. While this is not problematic at the first cache level, where separate trace and instruction caches are used, it can be a problem at second- and lower-cache levels 212, where entries from trace cache 204, instruction cache 206, and data cache 208 are coalesced. If trace information is being generated or used having the same corresponding cache line in cache levels 212 as instructions from instruction cache 206, the trace information will conflict with instructions in cache levels 212, thus preventing both pieces of information from being maintained in cache levels 212 simultaneously. Since trace information is only useful if the instructions it corresponds to can be accessed, it would be clearly problematic if instructions and their trace information were mapped to the same cache lines in lower cache levels 212. To remedy this situation, a hash function 210 is applied to the addresses of the entries in trace cache 204 so as to map a given cache line of trace information into a different address in lower cache levels 212 as the instructions that trace information corresponds to. This allows entries in trace cache 204 to have the same addresses as the instructions in instruction cache 206 to which they pertain, while ensuring that when the entries from trace cache 204 and instruction cache 206 are written to lower cache levels 212, corresponding entries will occupy different (non-conflicting) entries in lower cache levels 212.

Figure 3:
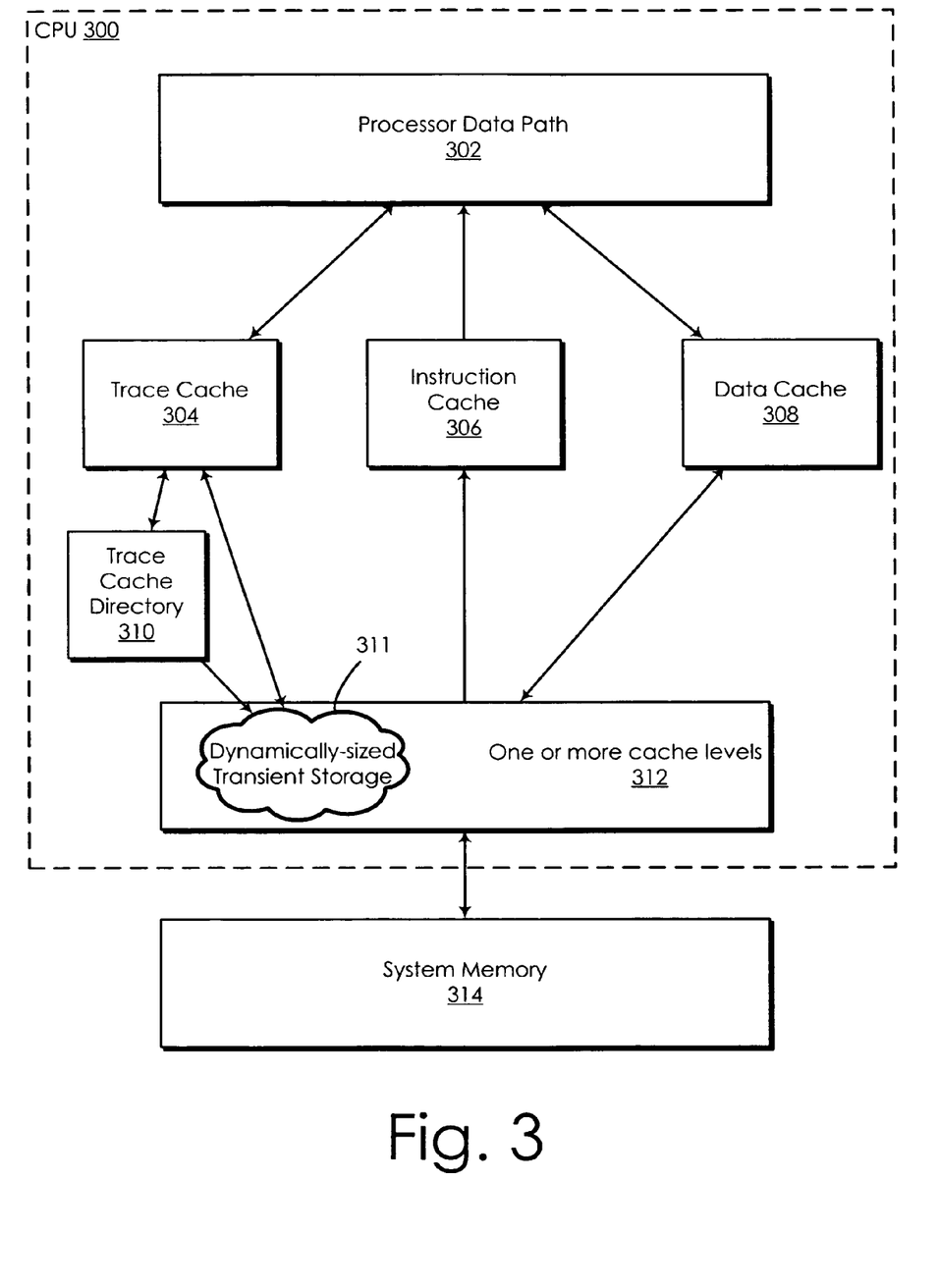
FIG. 3 is a diagram illustrating a hierarchical cache architecture employing dynamically-sized transient storage mapped using a secondary cache directory in accordance with a preferred embodiment of the present invention.

Another, more general, strategy that may be employed to eliminate conflicts in lower cache levels is to employ a trace cache directory 310 as in FIG. 3. In the embodiment described in FIG. 3, trace cache directory 310 is a table or other data structure that maps the address of a cache line in trace cache 304 into a corresponding entry in transient storage 311 in lower cache levels 312. In this way, instructions from instruction cache 306 may be directly mapped to their corresponding entries in lower cache levels 312, while trace cache entries 304 are mapped via an additional level of indirection provided by trace cache directory 310 to non-conflicting cache lines in lower cache levels 312.

Figure 4:
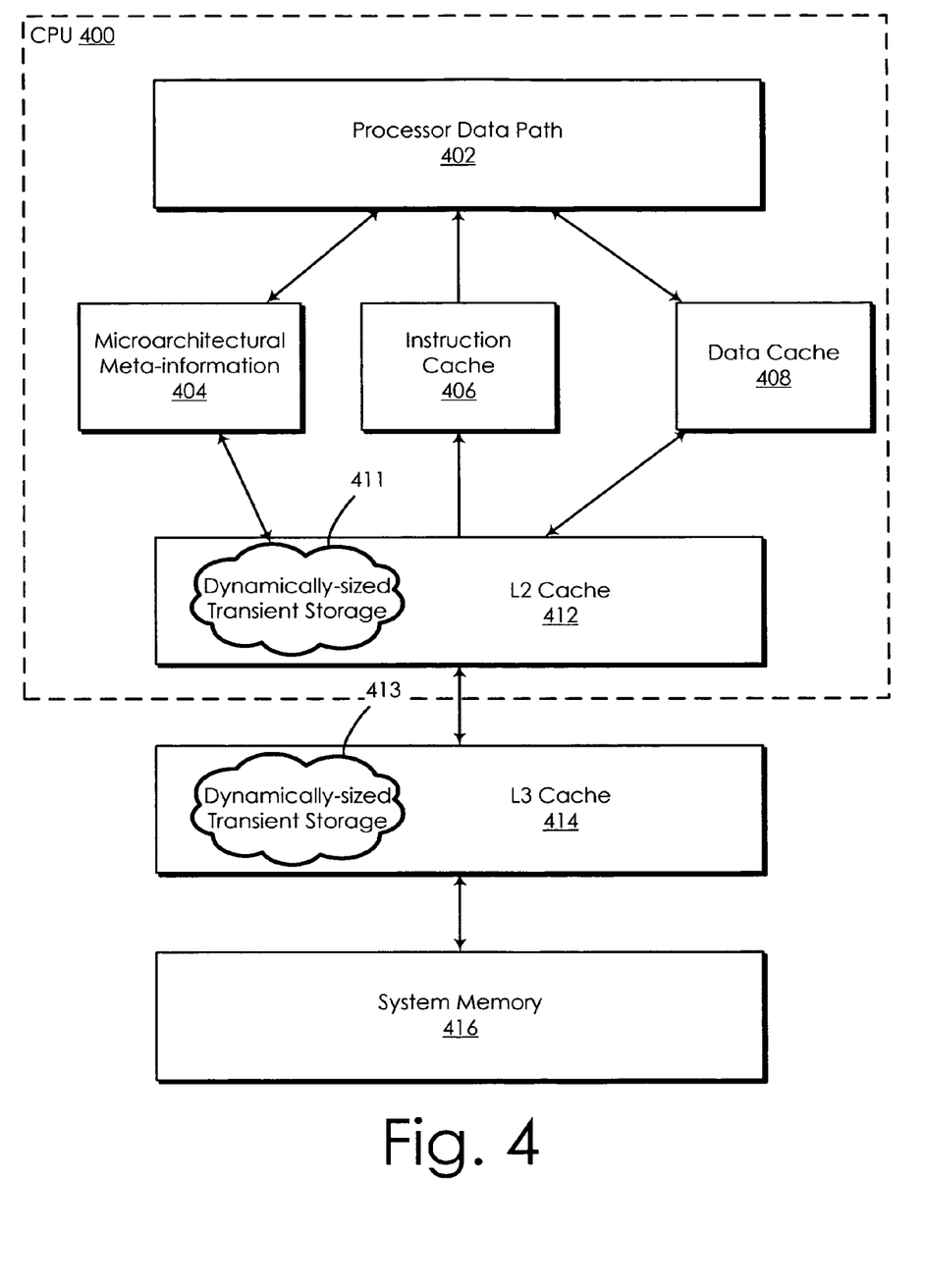
FIG. 4 is a diagram illustrating a hierarchical cache architecture employing dynamically-sized transient storage for storing microarchitectural meta-information in accordance with a preferred embodiment of the present invention.

FIG. 4 illustrates additional variations on the basic scheme of the preceding Figures. Specifically, FIG. 4 illustrates that transient storage may be utilized to store more general forms of information other than trace information, such as information regarding the state of CPU 400's microarchitecture at a given time or during execution of a given instruction, as illustrated by microarchitectural meta-information cache 404. FIG. 4 also illustrates that transient storage need not be limited to on-chip cache memory. FIG. 4 illustrates a processor-internal level 2 (L2) cache 412 containing transient storage entries 411 as well as an external level 3 (L3) cache 414 containing corresponding transient storage entries 413.

Also, although it is not specifically illustrated in FIG. 4, one skilled in the art will recognize that cache-address indirection of the type employed in FIGS. 2-3 to avoid cache-line conflicts may be employed in an embodiment according to FIG. 4, as well. Specifically, an address hash function (e.g., address hash 210) or directory (e.g., trace cache directory 310) or other suitable address indirection technique may be employed in a cache structure such as that depicted in FIG. 4.

Figure 5:
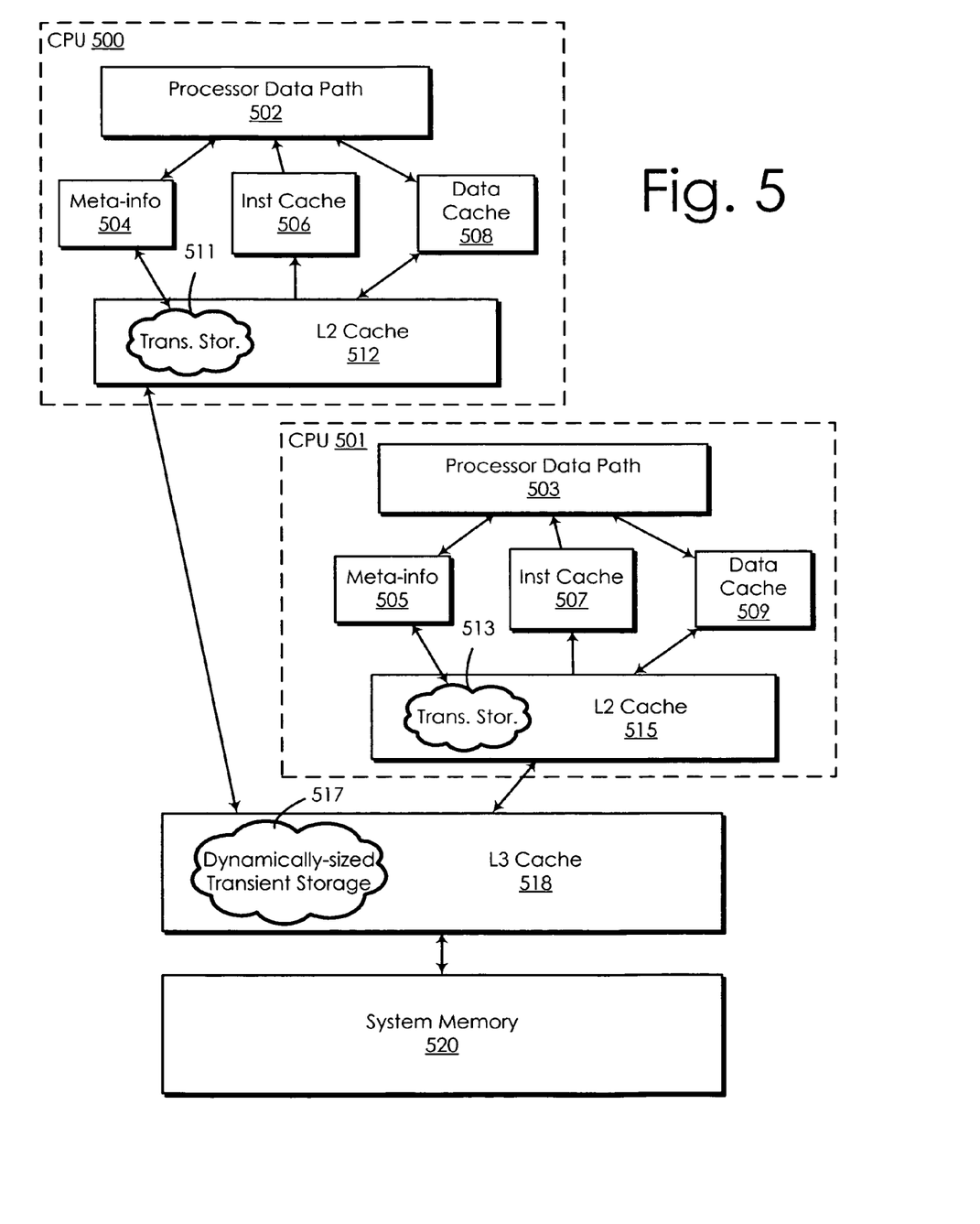
FIG. 5 is a diagram illustrating a hierarchical cache architecture employing dynamically-sized transient storage in a multiprocessor system in accordance with a preferred embodiment of the present invention.
Figure 6:
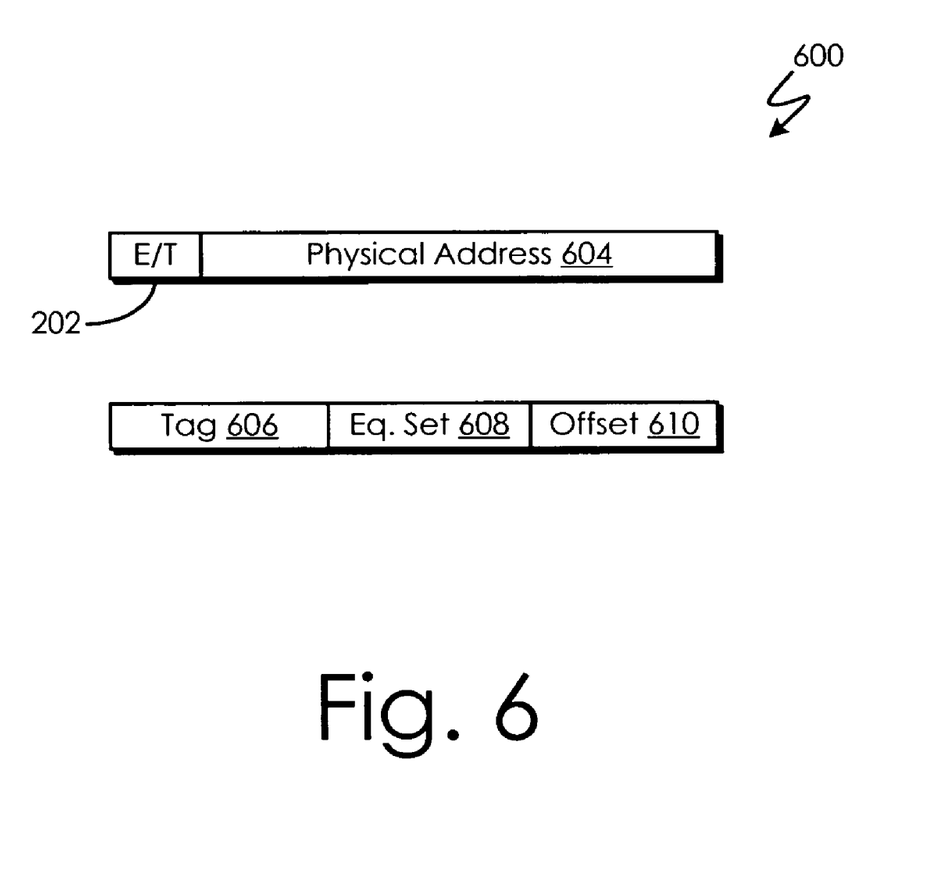
FIG. 6 is a diagram illustrating a cache entry supporting transient cache storage in accordance with a preferred embodiment of the present invention.

FIG. 5 illustrates yet another variation on the basic transient storage concept depicted in the previous Figures. FIG. 5 illustrates a shared memory/shared cache multiprocessor system architecture in which transient storage according to the present invention is utilized. In FIG. 5, two CPUs 500 and 501 are employed, each of which maintains its own transient storage in its respective L2 cache (transient storage 511 in L2 cache 512 and transient storage 513 in L2 cache 515). CPUs 500 and 501 share L3 cache 518, which both processors utilize for storing transient meta-information (transient storage 517). Transient information cache entries from CPUs 500 and 501 are coalesced in L3 cache 515 in much the same fashion as L1 cache entries are coalesced in a single processor.

Figure 7:
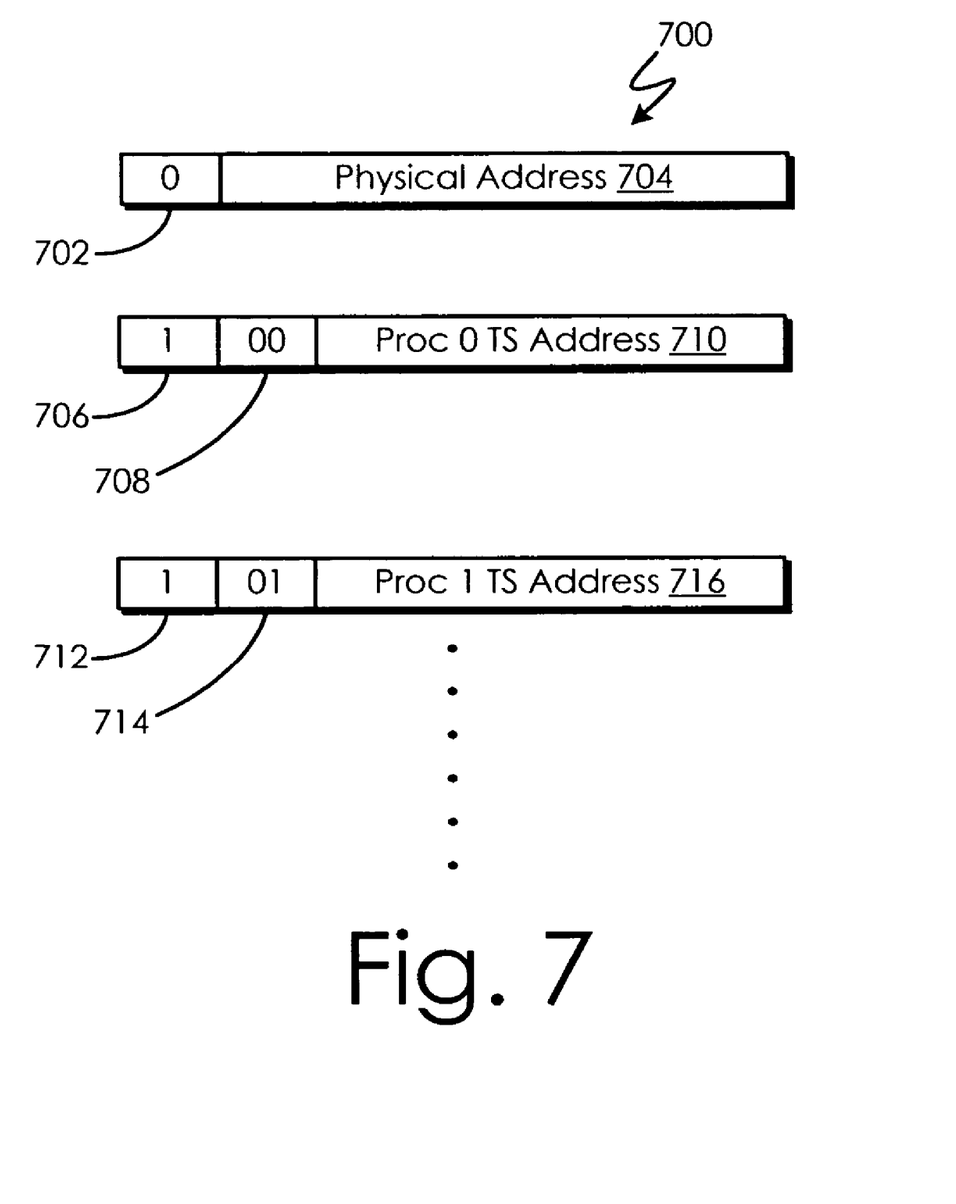
FIG. 7 is a diagram illustrating a cache entry shared among a plurality of processors in accordance with a preferred embodiment of the present invention.

As is illustrated in FIG. 7 (q.v.), conflicting transient storage addresses between processors may be avoided by using processor ID bits in the cache addresses used in L3 cache 518. Alternatively, other forms of address conflict avoidance, as illustrated in FIGS. 2 and 3 in the single-processor context, may be utilized instead or in addition to processor ID bits.

One skilled in the art will recognize that the scheme illustrated in FIG. 5 may be generalized to multiprocessor systems having any number of individual processors and that the two-processor example provided in FIG. 5 is not intended to be limiting.

FIGS. 6 and 7 illustrate the manner in which memory addresses are mapped into the addresses of cache lines in preferred embodiments of the present invention. FIG. 6 illustrates a single-processor case, such as might be employed in the context of the preferred embodiments described in FIGS. 2-4, while FIG. 7 illustrates a multiprocessor case, as might be employed in the context of an embodiment according to FIG. 5.

FIG. 6 depicts a format 600 for the addresses of memory locations in a cache in accordance with a preferred embodiment of the present invention. In this preferred embodiment, each address comprises 45 bits. The first bit, control bit 602, denotes whether the address represents ordinary storage or transient storage (e.g., "0" if ordinary storage, "1" if transient). The remaining 44 bits represent a physical address 604. By utilizing control bit 602 in this manner, it is possible to have transient storage addresses that are trivially correlated to ordinary physical addresses by the 44-bit portion of the address. This is useful when collecting statistics about a particular instruction or data memory location, for instance.

To interpret an address for the purpose of indexing cache lines within the cache, control bit 602 and the first several bits of physical address 604 are used as a tag 606 that, together with the next several bits of address 600 (equivalence set bits 608), uniquely identify a particular cache line. The offset of a particular memory location within that cache line is provided by the least significant bits 610 of the address. In typical operation, equivalence set bits 608 are used as an index to map a given cache line into a limited number of available cache lines, while tag 606 allows a cache-stored cache line to be correlated to its corresponding address range in main memory.

In alternative embodiments, control bit 602 may be used to form equivalence set bits 608 and/or the relative ordering of the various fields (control bit, equivalence set bits, tag bits, etc.) may differ. In yet another embodiment, an index function or hash function may be used to map tag bits and/or equivalence set bits into actual physical addresses in the cache; this can be used to allow two cache lines that would otherwise map to the same location in the cache to be stored simultaneously in different cache locations. For example, if a transient storage cache line is correlated to another ordinary storage cache line by the same 44 bit physical address, an index function or hash function can be used to map the two cache lines to different locations in the cache, so that both may be accessed simultaneously or in rapid succession without incurring the substantial performance penalty of having to swap one cache line for the other. One skilled in the art will recognize that a great deal of variation in the specific format and length of an address may exist without departing from the scope and spirit of the present invention.

In a preferred embodiment, transient storage addresses are "privileged" in that they are either not accessible to software or only accessible to supervisory or administrator-level software having appropriate permissions. According to this preferred embodiment, a number of functions are provided to allow administrator/supervisor software (such as an operating system, hypervisor, or other system software) to manage and/or modify the behavior of transient cache storage, either through the issuance of special transient-storage-related functions or via special-purpose registers intended for this purpose. These functions may include defining the size of the transient storage address space, invalidating one or more transient storage entries/cache lines, partitioning/allocating transient storage address space among a plurality of application programs (e.g., using memory protection schemes, as are known in the art), and directly reading or writing to/from transient storage space.

Where a cache memory system is shared among a plurality of processors an alternative address format such as address format 700 depicted in FIG. 7 may be utilized. According to address format 700, where the control bit is clear (e.g., control bit 702), the address corresponds to ordinary memory storage and the remaining 44 bits 704 represent a physical address.

Where the control bit is set, however, (e.g., control bits 706 and 712) a processor ID bit field (bit fields 708 and 714 in FIG. 7) denotes a particular processor associated with that transient storage address, and the remaining bits (bit fields 710 and 716 in FIG. 7) are used to store a processor-specific transient storage address. In the example depicted in FIG. 7, a two-bit processor ID field is used (which allows for a maximum of four processors), but one skilled in the art will recognize that a varying number of bits may be used in systems having differing numbers of processors.

Figure 8:
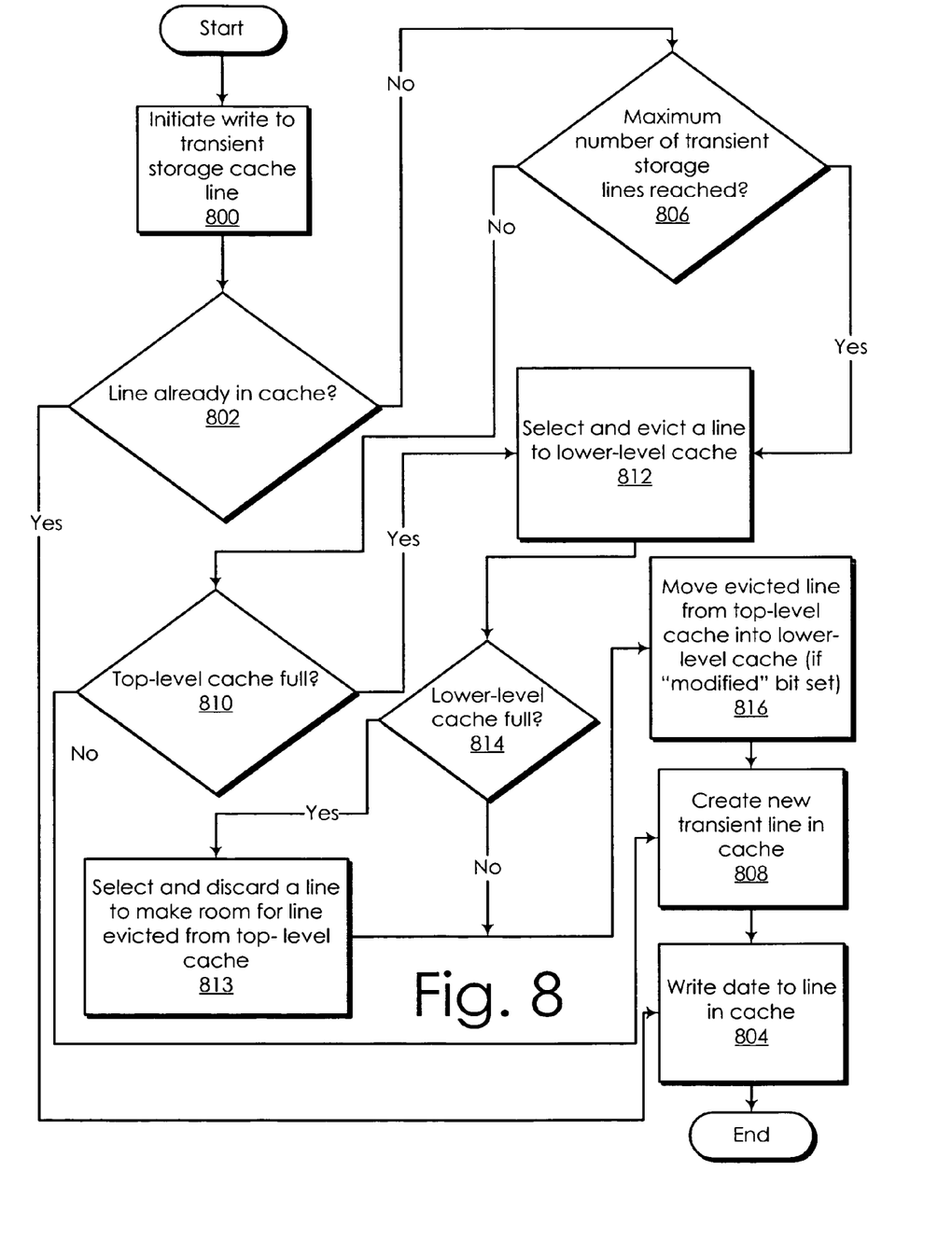
FIG. 8 is a flowchart representation of a process of writing to transient cache storage in accordance with a preferred embodiment of the present invention.

FIG. 8 is a flowchart representation of a process of writing to a transient storage cache line in accordance with a preferred embodiment of the present invention. FIG. 8 illustrates the differences between the operation of conventional cache storage and transient storage in accordance with a preferred embodiment of the present invention. Further, one skilled in the art will recognize that although only writing is described explicitly in FIG. 8, the corresponding read operation follows immediately from the following discussion. It should also be noted although the flowchart in FIG. 8 assumes a two-level cache, one skilled in the art will recognize that the general scheme depicted in FIG. 8 is applicable to caches having any number of levels.

Turning now to the specific actions illustrated in FIG. 8, a write operation to a cache line of transient storage is initiated at block 800. If the cache line exists in the top level of the cache (block 802:yes), the data is simply written directly to the existing cache line in the cache (block 804) and the process terminates.

If the cache line does not exist in the cache (block 802:no), however, a determination is made as to whether the maximum number of transient storage cache lines have been allocated in the cache (block 806) (in an alternative embodiment, this determination might be omitted to let transient storage accesses compete for the L2 cache resource on a dynamic basis). If not (block 806:no), then a determination is made as to whether the proper location in the top-level cache is already full (block 810). If it is not (block 810:no), then a new transient storage cache line is created (block 808) and the data written to that new cache line (block 804).

If the appropriate location in the top-level cache is already full (block 810:yes), however, then an appropriate cache line from the top-level cache is selected for eviction to the lower-level cache (block 812). If the lower level cache is full (block 814:yes), then a cache line from the lower level cache is selected and discarded to make room for the cache line evicted from the top-level cache (block 813). The evicted cache line from the top-level cache is then written back to the lower-level cache (block 816). A new transient storage cache line is created in the top-level cache (block 808) and the new data is written to that new cache line (block 804).

Figure 9:
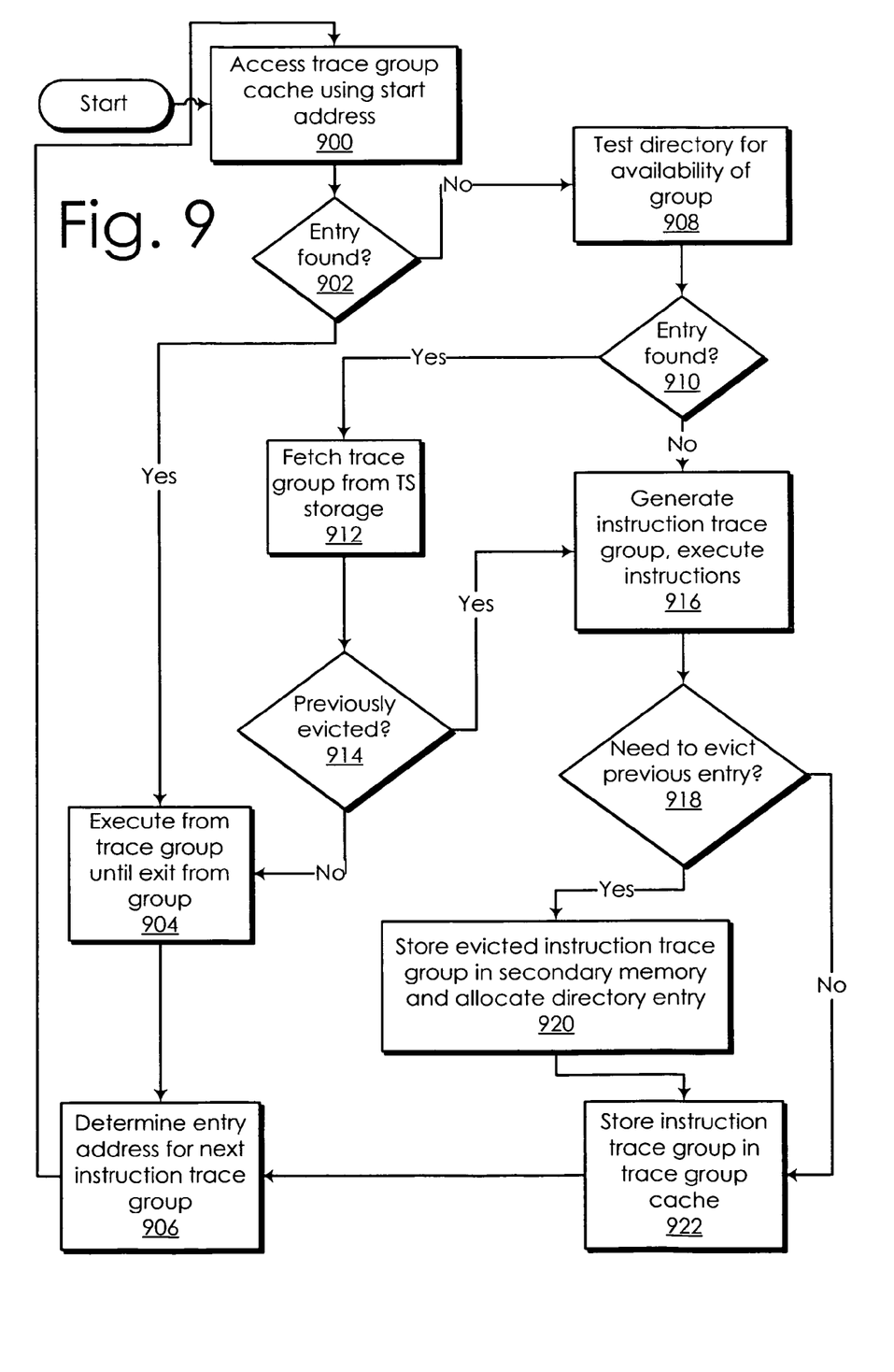
FIG. 9 is a flowchart representation of a process of using transient cache storage to provide a trace cache in accordance with a preferred embodiment of the present invention.

FIG. 9 is a flowchart representation of a process of utilizing transient storage to store trace group information for use in trace-based scheduling. In this embodiment, the transient storage used for trace group information is augmented with a directory to allow trace group information to be stored in either a transient storage location having the same 44-bit physical address as the beginning of the trace group itself or at another location, where necessary or appropriate. Turning now to FIG. 9, the process begins with attempting to access information corresponding to a particular trace group by using the 44-bit address of the trace group itself as the start address in transient storage of the trace group information (block 900). If an entry is found at that location (block 902: yes), then execution continues using the cached trace group information until the processor exits the group (block 904).

If an entry is not found using the start address of the group (block 902:no), then the directory is searched to see if trace group cache information has been stored at another address (block 908). If so (block 910:yes), then the information is fetched from the appropriate location in transient storage (block 912). The integrity of the fetched information is then checked to determine whether the information has actually been evicted from the cache and is, hence, not available for use (block 914). If the information has not been evicted from the cache (block 914:no), then execution continues using the cached trace group information until the processor exits the group (block 904).

If the fetched information was previously evicted from the cache (block 914:yes) or if no entry was found in the directory (block 910:no), then a new instruction trace group is generated and the instructions corresponding thereto are executed (block 916). If a previous entry must be evicted to make room for the new group information (block 918:yes), then the evicted instruction trace group is stored in a secondary memory structure and a directory entry for the evicted group information is generated (block 920). The new instruction trace group is then stored in the trace group cache within transient storage (block 922).

Once the current trace group finishes executing, the start address for the next instruction trace group is determined (block 906). The process then cycles back to block 900 for the next trace group.

One skilled in the art will recognize that a number of additional variations on the present invention as disclosed herein may be practiced without departing from the scope of spirit of the present invention. For example, in one possible embodiment, a transient storage address can be mapped into address space of a program or programs by using dedicated page table entries (e.g., in a paged virtual memory system) indicating a mapping to a transient storage address. A privileged program, such as an operating system, may then use addresses so mapped to store and/or retrieve transient program data. Alternatively, a user program may be permitted to store and retrieve transient program data in this fashion.

In another possible embodiment, a request for a transient address that has been evicted (and which, therefore, fails) is satisfied by providing a default value (or "NULL" value). In yet another embodiment, the failed request may be indicated by triggering some kind of notification event, which may be indicated by setting a register or condition flag value in the processor or by making some other change to the program state. Alternatively, the notification event may come in the form of a raised exception or interrupt. As one skilled in the art will recognize, other forms of notification of a failed request may be utilized in an actual embodiment of the present invention, without limitation, and without departing from the scope or spirit thereof.

One possible implementation of the invention is in the form of a set of instructions (microcode) or other functional descriptive material in a code module that may, for example, be resident in the random access memory of the computer. Until required by the computer, the set of instructions may be stored in another computer memory (or other tangible storage medium), for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine, in other words, executable computer code.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method comprising:
   determining that a cache line of information should be removed from a cache;
   applying an index function to an address associated with the cache line of information to map the cache line of information to a location in the cache;
   determining whether the cache line of information has been designated as transient storage;
   preserving the cache line of information in main memory only if it is determined that the cache line of information has not been designated as transient storage; and
   wherein the cache line of information is designated as transient storage via an inclusion of at least one control bit in an address associated with the cache line of information.

2. The method of claim 1, further comprising:
   discarding the cache line of information in response to determining that the cache line of information should be removed from the cache if it is determined that the cache line of information has been designated as transient storage.

3. The method of claim 1, wherein the cache is an upper-level cache and the method further comprises:
   preserving the cache line of information in a lower-level cache only if it is determined that the cache line of information has not been designated as transient storage.

4. The method of claim 1, further comprising:
   establishing a maximum number of transient storage cache lines, such that no more than the maximum number of transient storage cache lines may be allocated within the cache.

5. The method of claim 1, wherein the cache line of information includes instruction trace group information.

6. The method of claim 1, wherein the cache line of information is associated with one of a plurality of processors in a computer system and at least a portion of the cache is shared among the plurality of processors.

7. A processor comprising:
   first determining logic, wherein the first determining logic determines that a cache line of information should be removed from a cache;
   mapping logic, wherein the mapping logic applies an index function to an address associated with the cache line of information to map the cache line of information to a location in the cache;
   second determining logic, wherein the second determining logic determines whether the cache line of information has been designated as transient storage;
   conditional preserving logic, wherein the conditional preserving logic preserves the cache line of information in main memory only if it is determined that the cache line of information has not been designated as transient storage; and
   wherein the cache line of information is designated as transient storage via an inclusion of at least one control bit in an address associated with the cache line of information.

8. The processor of claim 7, further comprising:
   discarding logic, wherein the discarding logic discards the cache line of information in response to determining that the cache line of information should be removed from the cache if it is determined that the cache line of information has been designated as transient storage.

9. The processor of claim 7, wherein the cache is an upper-level cache and the conditional preserving logic preserves the cache line of information in a lower-level cache only if it is determined that the cache line of information has not been designated as transient storage.

10. The processor of claim 7, further comprising:
    transient storage limiting logic, wherein the transient storage limiting logic enforces numerical limitation on transient storage cache lines, such that no more than a maximum number of transient storage cache lines may be allocated within the cache.

11. The processor of claim 7, wherein the cache line of information includes instruction trace group information.

12. The processor of claim 7, wherein the cache line of information is associated with one of a plurality of processors in a computer system and at least a portion of the cache is shared among the plurality of processors.

13. A computer program product in a computer-readable storage medium, comprising functional descriptive material that, when executed by a computer, causes the computer to perform actions that include:
    determining that a cache line of information should be removed from a cache;
    accessing a transient storage via a mapping of the transient storage into a virtual address space in a virtual memory system;
    determining whether the cache line of information has been designated as transient storage;
    preserving the cache line of information in main memory only if it is determined that the cache line of information has not been designated as transient storage; and
    wherein the cache line of information is designated as transient storage via an inclusion of at least one control bit in an address associated with the cache line of information.

14. The computer program product of claim 13, comprising additional functional descriptive material that, when executed by a computer, causes the computer to perform actions of:
    establishing a maximum number of transient storage cache lines, such that no more than the maximum number of transient storage cache lines may be allocated within the cache.

15. The computer program product of claim 13, wherein the cache line of information includes instruction trace group information.

* * * * *